Figure 1:
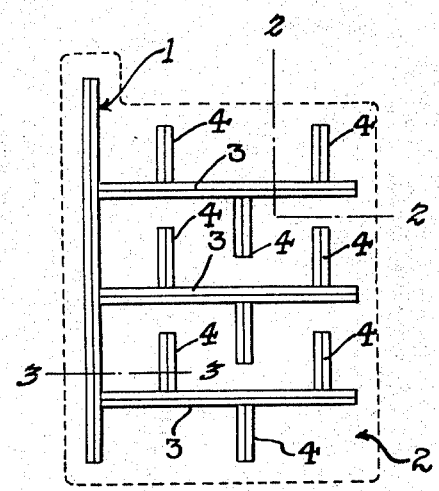

May 11, 1937.  A. RUDOLF  2,080,340

ELECTRIC BATTERY

Filed Sept. 29, 1932

INVENTOR
ARTUR RUDOLF

Smith, Michael and Gardiner,
ATTORNEYS.

Patented May 11, 1937

2,080,340

UNITED STATES PATENT OFFICE 2,080,340

ELECTRIC BATTERY

Artur Rudolf, Berlin, Germany, assignor to The Rulag Battery Company Limited, London, England Application September 29, 1932, Serial No. 635,339
In Germany October 5, 1931

2 Claims. (Cl. 136—27)

This invention relates to secondary lead cells.

In the manufacture of the plates for lead accumulators in which the plates are in the form of a grid or mass-plates, the active material which consists of litharge and minium (red lead) is always first worked into a paste and then, whilst in this wet condition is introduced into a rigid supporting frame of lead or lead alloy constructed in the form of a grid which acts not only as a support for the paste but also as an electrical conductor. Owing to the fact that the paste after drying forms a mass having an internal structure which is undesirably dense, there is frequently mixed with the paste, agents which render it porous. The lead sponge of the negative plate and the lead peroxide of the positive plate is then produced electrolytically by reduction and oxidation respectively of the active mass embedded in the supporting frame.

Secondary lead cells hitherto employed possess many disadvantages, thus, for example, the rigid supporting frames of lead which form part of the electrodes only participates to a very small degree in the chemical exchange of energy, whilst, however, they contribute largely towards the already considerable weight of the lead cell owing to the fact that they must be made strong and rigid, and incidentally they necessitate the employment of stronger receptacles for the electrodes. Further, the non-flexible nature of the supporting frame materially affects the necessary cohesion between the active material and the plate so as to cause the material eventually to become loosened and this loosening, in course of time, gradually becomes more and more noticeable, as the material is subject to the effects of expansion and contraction. The fact that lead and lead peroxide lie close together at the surface of the positive electrode gives rise to rapid self discharge. The electrodes must be charged and discharged several times by the manufacturer because they only acquire their full capacity after having been so repeatedly charged and discharged. Such peculiarities as exhibited by the known lead cells limit to a substantial extent the scope of their employment as a secondary cell.

Now, various proposals have already been made for eliminating the disadvantages referred to above and other disadvantages inherent in the transportable secondary lead cells in general use. For the most part these proposals have aimed at elimination of a lead supporting frame altogether. Thus, it has been proposed that the known constructional materials employed in lead accumulator electrodes should be molded into plates by pressing and to apply to or insert into said plate a metal conductor. Reference has also been made to the inclusion of lead peroxide as a material for constructing lead accumulator plates, as well as to the employment of lead powder as a constructional material. The results obtained, however, have not been satisfactory.

Now it has been found as the result of considerable experimentation and research that it is possible by employing as an essential constituent at least of the active mass of the electrode finely divided spongy lead, to produce a perfectly rigid and self-supporting electrode for a secondary lead cell by pressing the mass dry in contrast to first forming it into a paste and thereafter molding it to the required shape, or as is more usual, filling it into the recesses or interstices of a grid or supporting plate.

More especially, in the case of a positive electrode, the active mass including as an essential constituent, as stated, finely divided spongy lead, may also contain a proportion of one or more of the lead compounds customarily employed in the art, for example peroxide of, lead or the particular form of lead oxide hereinafter described, this compound or compounds being intimately admixed in finely divided form with the spongy lead prior, of course, to the dry pressing of the mass to the desired form of the electrode.

As stated, it has been found possible by the means described above to produce a secondary lead cell electrode which is perfectly rigid in itself or, in other words, is inherently self-supporting, that is to say, without the need for any form of grid or supporting plate. The electrode produced, moreover is considerably lighter and smaller for a given working capacity than the grid type electrode. In addition, it shows a lesser tendency to self-discharge and it is capable of being manufactured cheaply by mass production methods and moreover in a very small and thin form.

A further and highly important advantage accruing from the invention is the fact that dry pressing is a so much cleaner operation than the conventional practice of first forming a paste or amalgam of the active materials and then either molding this paste to the required form of the electrode or as is more usual filling it into the recesses or interstices of a grid or supporting plate. Thus as hereinafter described the process according to the present invention simply comprises taking a mass of finely divided spongy lead in intimate admixture, more especially in the case of a positive electrode, with a suitably selected lead oxide compound also in finely divided form, consolidating this powdered mass in a suitable mold of the desired ultimate form of the electrode, moistening the pressed product with dilute sulphuric acid and then drying off.

This simple procedure is applicable irrespective of whether the electrode be a positive electrode or a negative electrode.

In order to provide for efficient current distribution throughout the mass of the electrode, it is preferable to incorporate therewith a metal current conductor, which it has been found can readily be incorporated in the spongy lead or spongy lead-lead oxide mass by simply pressing the parent powder of the mass about the conductor to be incorporated therein, that is to say, in the operation of pressure molding to the form of a rigid coherent plate of the ultimate desired shape of the electrode. Such a conductor incorporated in the electrode is preferably freely yieldable to external deforming pressures upon it, such as may be eventually imposed in the use of the electrode due to local expansion and contraction therein. By this means the difficulty referred to above of loosening or disintegration of the electrode from the metal conductor is completely avoided and in addition there is the further advantage that by employing a freely yieldable or deformable conductor the dry pressure molding or consolidating operation performed upon the powdered mass of spongy lead, with or without lead compounds, is considerably facilitated, for the conductor affords little or no resistance to the otherwise free flow of the mass in the mold while at the same time it remains intact in itself, that is to say, free from fracture by the somewhat high consolidating pressures which are requisite as hereinafter indicated for the dry pressing of the mass.

In the accompanying drawing, wherein for the purpose of illustration I have shown several preferred embodiments of my invention.

Figure 2:
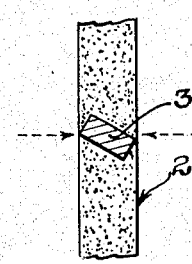
Figure 3:
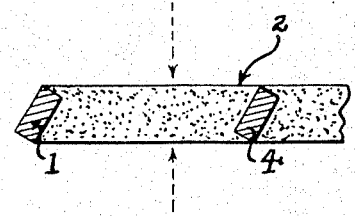

Figure 1 is a plan view of an electrode made in accordance with my invention and showing in full lines one form of embedded metal conductor, Fig. 2 is a fragmentary, enlarged, sectional view on the line 2—2 of Fig. 1, and Fig. 3 is a fragmentary, enlarged, sectional view on the line 3—3 of Fig. 1.

With reference now to the particular form of lead oxide referred to above, it is known in the production of lead peroxide to treat minium with hot nitric acid, the dark coloured powder so produced being lead peroxide. However, it was not hitherto known that a separate and distinct brown stable lead compound could be obtained by treating minium with dilute nitric acid, and interrupting the treatment before the formation of dense lead peroxide in the usual commercial manner has set in, or at least set in to any considerable extent.

In most cases, however, owing to the fact that in this method of manufacture, it is almost impossible to stop the treatment at exactly the right moment, it will in practice be found that the treatment will be possibly interrupted either too early or too late in the process and the new material will either contain minium residues or already formed dense lead peroxide. Such small quantities of impurities do not, however, prejudice the use of the material in the construction of electrodes.

The following will serve as a typical example of the above process for the production of the brown lead compound. According to this process, 1,000 grams of minium are thoroughly moistened with 333 cc. of distilled water, and 600 cc. of nitric acid of specific gravity=1.4 diluted with 840 cc. of water. When both liquids are mixed together before being added to the mixture of minium and water, they should be brought to a temperature of 24° C. After fifty minutes, the treatment is interrupted and the brown precipitate thus obtained is washed.

The brown lead compound so obtained has, as a rule, a specific gravity of less than 7, and in any case less than 8, whilst the specific gravity of lead peroxide, usually employed in commerce, is always over 8. Further when the volume of 10 grams of the new material is measured in ether in a Chancel sulphurimeter which comprises a glass tube graduated in cubic centimetres and the material and the ether is shaken so as to thoroughly saturate the material with ether, it being found that if the sulphurimeter is now placed in a stand, the material will at first rapidly settle out for a certain definite period, whereupon its rate of settlement suddenly alters and becomes very less marked at which point the level of the material in the sulphurimeter is taken and multiplied by ten to obtain the reading for 100 grams. This reading is hereinafter referred to as the "immediate reading". The "immediate reading" of the volume by displacement, measured in ether, of 100 grams of the new material is as a rule over 100 cc., whilst, on the other hand, in the case of the same quantity by weight of lead peroxide, it is less than 75 cc. The oxygen content that can be released by heat from the new material amounts to approximately 93% of the amount released from a cold weight of lead peroxide under the same conditions. The electric conductivity resistance of a cube of 1 cm. edge at a pressure of 100 kg. amounts, in the case of lead peroxide, to more than 0.5 ohm, whilst in the case of the new material, it amounts to less than 0.2 ohm. Judging from its chemical composition, it might be said that the brown lead compound approximates to a hydrate of lead peroxide.

The lead compound described has not hitherto been employed in the construction of an electric battery, and especially in the construction of secondary lead cells.

In the production of positive electrodes for lead cells composed solely of the active material, the procedure may for example be such that an air dry pulverulent mixture of lead compounds recognized in the manufacture of electrodes for lead cells which is combined with the new constructional material, is pressed around a metal conductor 1, the pressed products 2 being in addition treated with dilute sulphuric acid, preferably to a point at which the acid within the plate and exterior thereof are of equal density and for a period which is at least ten minutes, and then allowed to dry. The embedded metal conductor 1 may be of quite a light and flexible character, since it will not be required to serve as a rigid support for the active mass, but will only serve to distribute the current within the active material.

An example of positive electrodes constructed as above consists substantially of materials in the following proportions:—

*Example I*

| | Percent |
|---|---|
| Finely divided spongy lead (preferably dried with sulphuric acid adhering to it in the manner hereinafter described) | 30 |
| The brown oxide of lead manufactured in the manner hereinbefore described | 40 |
| Minium | 30 |

The pressure to be applied in pressing the plates is substantially 250 kilograms per square centimetre and the plate is hardened in a solution of sulphuric acid of a specific gravity of 1.18 for a period of approximately half an hour in the case of a plate 1.5 mm. in thickness. It will be appreciated that the density of the sulphuric acid employed for hardening is approximately that of the electrolyte used in a secondary lead cell and further, if necessary, any other hardening method may be employed.

In the case of positive electrodes where it is intended that they should attain their full capacity at a single charge, it has been shown to be of advantage to start with a press material, consisting of the brown lead oxide compound to the extent of more than 15%.

Positive electrodes of this type produced according to the invention may be combined per se with negative electrodes of a known construction, used in secondary lead cells. The scope of application of the positive electrode in secondary lead cells will, however, be extended and additional economy in weight and space in the lead cell will be attained, when they are simultaneously employed with negative electrodes which consist merely of the active material with the embedded conductor.

As already indicated herein, use is made in the production of negative electrodes, of the same pressing, moistening and drying process as is employed in the case of the positive electrodes, there being used as a press material, however, a pulverulent lead sponge impregnated with lead sulphate, to which if necessary there may be added lead oxides. Such a press material lends itself excellently to pressing and produces very efficient negative electrodes which may be incorporated in the same manner as the positive electrodes.

In the production of lead sponge impregnated with lead sulphate the procedure adopted may comprise reducing lead oxides in a bath of sulphuric acid by means of electrolysis, which are thereupon dried off together with the adhering sulphuric acid and then ground up.

In producing electrodes, according to the present invention, by pressing dry pulverulent mixtures, it is important that they should be given as perfect a structural uniformity as possible. Since in the case of powders, the pressure is not, as with liquids, uniformly distributed over the volume to be pressed, and has, therefore, a different effect on the upper layers from that on the layers lying below, it is advisable to press the electrodes into plates the thickness of which are not too great, whilst allowing the pressure to be exercised simultaneously in a known manner on both surfaces of the plate. An embedded metal conductor constitutes, however, in the structural system of the plate a foreign body, which, under certain circumstances, makes it questionable whether such electrodes are capable of application at all. It has now been found that the internal structural uniformity in pressed electrodes is the least impaired by an embedded metal conductor, when the section of the latter is of an oblong or of a rhombic shape, preferably constructed so as to produce edges and surfaces inclined to the direction of pressure, and the conductor is preferably inserted in the material so that the longer axis of the section is arranged in the direction of pressure. In Figs. 2 and 3 of the accompanying drawing I have illustrated by proper sectional views, the shape or configuration of the embedded metal conductor 1 and, by means of arrows, have illustrated the disposition of the oblong or rhombic sections in relation to the direction of pressure, so that it will be readily apparent that in the manufacture of the preferred form of my embedded conductor and electrode, the longer axis of the section of the conductor is arranged in the direction of the pressure applied to the pressed-in active material.

In order to attain the best possible current distribution within pressed electrodes the non-rigid embedded conductor 1 is preferably arranged with lateral extensions 3 from which extend branches 4. An advantage is to be obtained, according to this invention, in designing the lateral extensions 3 and the branches 4 of such embedded conductors by ensuring that each lateral extension 3 and its branches 4 is independent of its neighbour, so that the extensions and the branches in no way form a frame. Each extension 3 and branch 4 has a free end and does not form, for example, an enclosed rectangular figure with any other extension or branch. By means of this step, the advantage is attained that the conductor 1 may conveniently yield to any expansion or contraction in the active material.

The combination of positive and negative electrodes constructed in accordance with this invention for secondary lead cells does not present any especial difficulties, in cases where such cells are employed in place of the present day lead accumulators. Such electrodes are appropriately inserted in suitably designed packets and the whole is then mounted, suspended or otherwise fastened within the cell-container. Dilute sulphuric acid is used as an electrolyte in the same way as it is used nowadays in accumulators.

Small cells intended for hand use, for example, in a pocket lamp, must satisfy other requirements than those applying to normal accumulators. They must be as small and as light as possible and maintain their efficiency for a long time, be secure against eventual breakage and generally appeal to the public taste. They must not lose their acid and must, furthermore, be cheap to produce. Such requirements demand special measures.

The use of sulphuric acid as an electrolyte in liquid form cannot, from the point of view of safety and for other reasons, be entertained in the case of such small lead cells. Therefore, it is most advantageous to thicken the electrolyte, for example, in a suitable manner. Water glass is a well known thickening agent for dilute sulphuric acid. An electrolyte gelatinized with water glass in this manner as hitherto employed in lead accumulators, is, however, not very suitable for small cells, since the gel shrinks and it may happen that large portions of the electrode are rendered inoperative thereby. It has been found according to this invention that gel is also suitable for lead cells with very highly strained electrode surfaces, provided it is introduced into the cells in an aged condition. The ageing process, the course of which it in itself very slow in the case of such gels, may be substantially accelerated by keeping a mixture of dilute sulphuric acid and a gelatinizing agent in continual motion, for example, by stirring. In order to attain a permanent approximately grease-like consistency of the electrolyte it has further been regarded as advantageous to mix therewith kieselguhr or another material possessing a similar action.

In an aged gelatinous electrolyte produced in this manner liquid does not subsequently separate out therefrom, and it has moreover the advantage, that even in the case of possible damage to the cell container, no acid can leak out. Moreover, it has also been found that such a gelatinous electrolyte produced causes only a slight loss in capacity in lead cells, in contradistinction to cases where liquid electrolytes are used, so that it may also with advantage find application in secondary cells of any constructional type, where the purpose for which the cells are intended involves, in the use of a liquid electrolyte, the risk of acid leaking from the container.

In the construction of small lead cells with positive and negative electrodes produced by dry pressing in accordance with this invention, and containing gelatinized electrolyte, the electrodes are charged in fluid electrolyte outside the cell container and in this condition they are incorporated within the cell container filled with gelatinized electrolyte. By means of such a method as this, the production of the cells is not only rendered cheaper, but above all the attainment of absolute uniformity in efficiency of the cells is thus assured.

The particular brown oxide of lead referred to above and having the properties described differentiating it from lead peroxide, will for purposes of brevity and convenience be referred to in the following claims as the brown oxide of lead hereinbefore specified.

What I claim and desire to secure by Letters Patent of the United States is:—

1. In the manufacture of a positive electrode for a secondary lead cell, the process which comprises dry pressing to the desired form of the electrode, a powder mass composed essentially of the brown oxide of lead hereinbefore specified, in intimate admixture with a substantial proportion and sufficiency of finely divided spongy lead to form as the result of the dry pressing operation a rigid inherently self-supporting member in the sense herein indicated.

2. In the manufacture of a positive electrode for a secondary lead cell, the process which comprises the steps of dry pressing to the desired form of the electrode, a powder mass composed of approximately 40% of the brown oxide of lead hereinbefore specified, approximately 30% of finely divided spongy lead and approximately 30% of minium, so as to form as the result of the dry pressing operation a rigid inherently self-supporting member in the sense herein indicated, moistening the member so produced with dilute sulphuric acid and thereafter drying it.

ARTUR RUDOLF.